No. 768,824. PATENTED AUG. 30, 1904.
E. P. SHELDON & W. B. STORY.
ADDRESSING MACHINE.
APPLICATION FILED OCT. 24, 1903.
NO MODEL. 6 SHEETS—SHEET 2.

Witnesses:
James F. Duhamel
Wm. N. MacLeod

Inventors:
Edward P. Sheldon
Ward B. Story
By their Attorney
Edward Conger Brown No. 768,824. PATENTED AUG. 30, 1904.
E. P. SHELDON & W. B. STORY.
ADDRESSING MACHINE.
APPLICATION FILED OCT. 24, 1903.
NO MODEL. 6 SHEETS—SHEET 4.

Patented August 30, 1904.

UNITED STATES PATENT OFFICE.

EDWARD P. SHELDON AND WARD B. STORY, OF NEW YORK, N. Y.; SAID STORY ASSIGNOR TO SAID SHELDON.

ADDRESSING-MACHINE.

SPECIFICATION forming part of Letters Patent No. 768,824, dated August 30, 1904.

Application filed October 24, 1903. Serial No. 178,399. (No model.)

*To all whom it may concern:*

Be it known that we, EDWARD P. SHELDON and WARD B. STORY, both citizens of the United States, and residents of the borough of Brooklyn, county of Kings, city and State of New York, have invented certain new and useful Improvements in Addressing-Machines, of which the following is a specification.

Our invention relates to addressing-machines, and has for its object the printing of names and addresses on wrappers or envelops in which newspapers or other printed matter or packages to be mailed are inclosed.

The invention consists in the novel construction, arrangement, and combination of devices and parts, which will be more clearly described in the following specification, and particularly pointed out in the appended claims.

Many of the details of construction here shown are also illustrated in an application for a patent for a similar machine filed by us and bearing the same date of filing as this application.

In the drawings accompanying this specification and forming a part thereof like reference characters designate like parts.

The frame of the machine is composed of the sides 1 and horizontal bed 2, the latter carrying an upper structure 3 and having openings 4 on each side of its center. There are other and smaller openings in the bed, which will be later referred to in connection with the parts operating through them. The frame carries about midway of its length a transverse driving-shaft 5, to which is secured suitable cams and pulleys used in the operation of the various working parts, as will be hereinafter more fully described. Bridging the openings 3 are rails 6, which carry rollers 7 to carry and facilitate the movement of the galley 8 over the bed of the machine as it is being shifted one way or the other under the impression-blocks which effect the printing of the addresses. The galley 8 is a rectangular frame carrying several columns of separated addresses 9, and around the entire margin of the columns of type is placed a rectangular frame composed of toothed or notched side pieces 10 and overhanging head and tail pieces 11 and 12. The object of this frame and the peculiar construction of its sides is to enable the feed-fingers 13 to engage the teeth and move the galley along the bed 2. The end piece 12 is secured to the side pieces 10, while the forward end piece 11 has its end dovetailed to one of the side pieces and a lug $11^a$ fits into one of the teeth on the side piece 11 of right-hand side and permits of the locking of the frame around the columns of type to insure the proper rigidity of the frame while the feed-fingers operate upon it.

Figure 4:
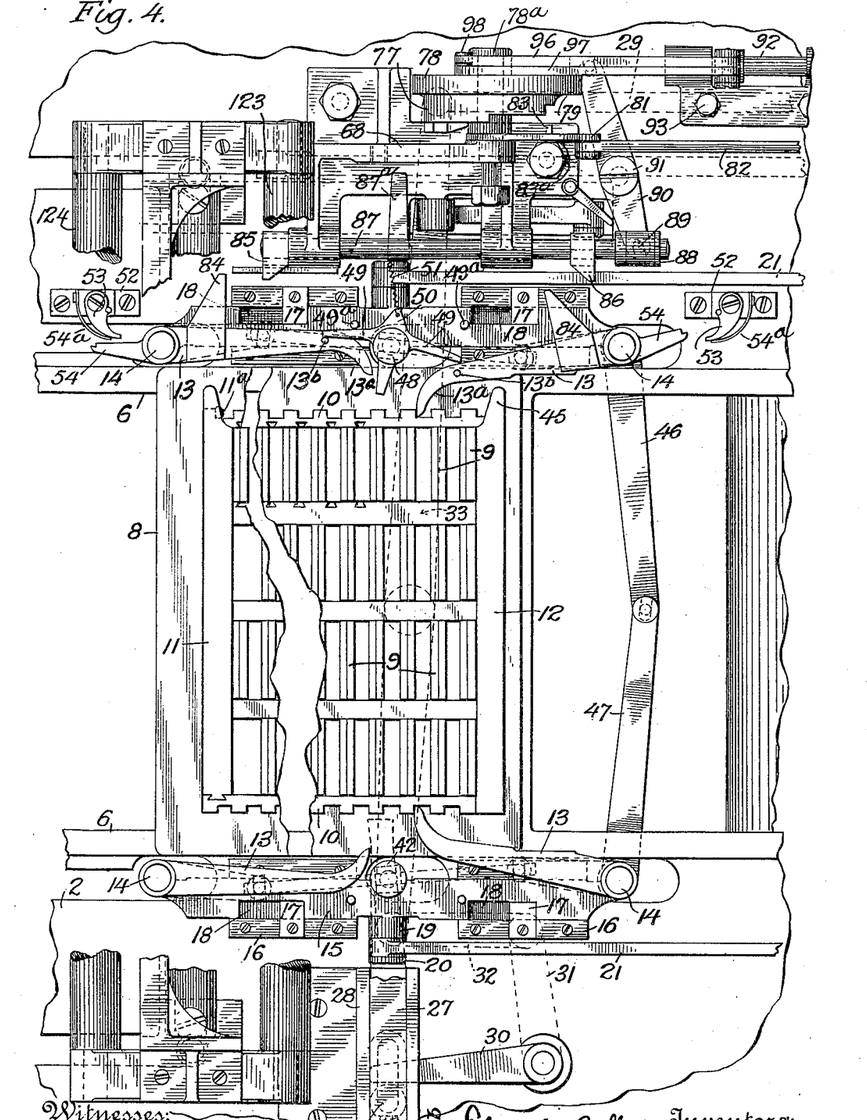
Fig. 4 is an enlarged detail plan view illustrating the mechanism for propelling the galley.

The feed-fingers 13 are clearly shown in Fig. 4, where two of them are shown as moving the galley from the front to the rear of the machine and where it will be seen that they are pivoted, by means of the pin 14, to two longitudinally-sliding blocks 15, carried on the bed 2 between the guide-plates 16, and the movement of the blocks is limited by the offsets 17, projecting from the plates and playing in the slots 18 of the blocks. To bosses 19 about midway of the blocks are pivoted, by means of the pins 20, the ends of links 21, whose other ends are connected with crank-arms 22, secured to the transverse shaft 23, which is journaled in the sides of the framework of the machine. This shaft 23 carries a substantially horizontal arm 24 at about a right angle with the arms 22, and a roller on the end of the arm 24 plays in an eccentric groove 25 of a disk 26, keyed to the power-shaft 5. The rotation of the shaft 5 causes the rocking of the arms 24 and 22 and the reciprocation of the block 15, and two of the fingers 13, which are so set, engage the teeth in the side 10 of the frame and move the frame and galley toward the rear of the machine.

Figure 1:
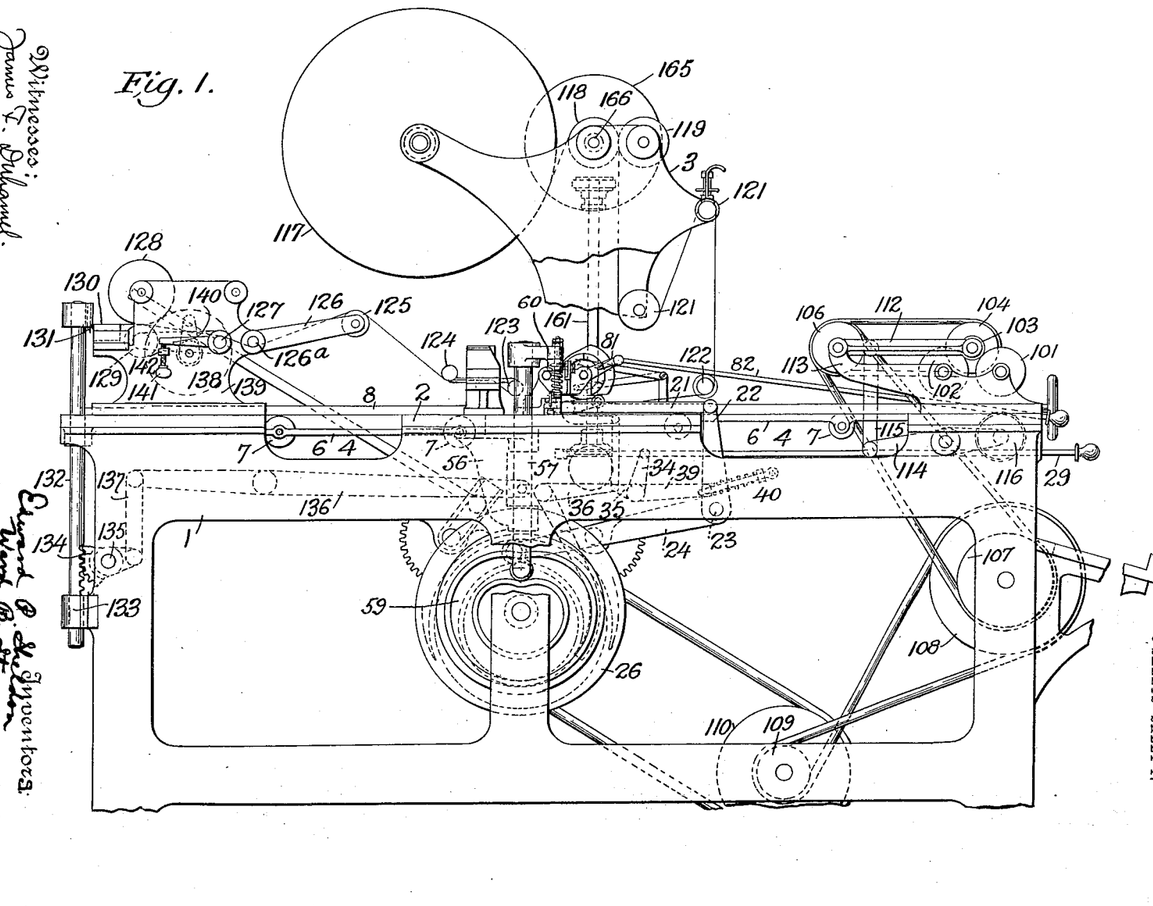
Figure 1 is a side elevation of our improved machine.
Figure 5:
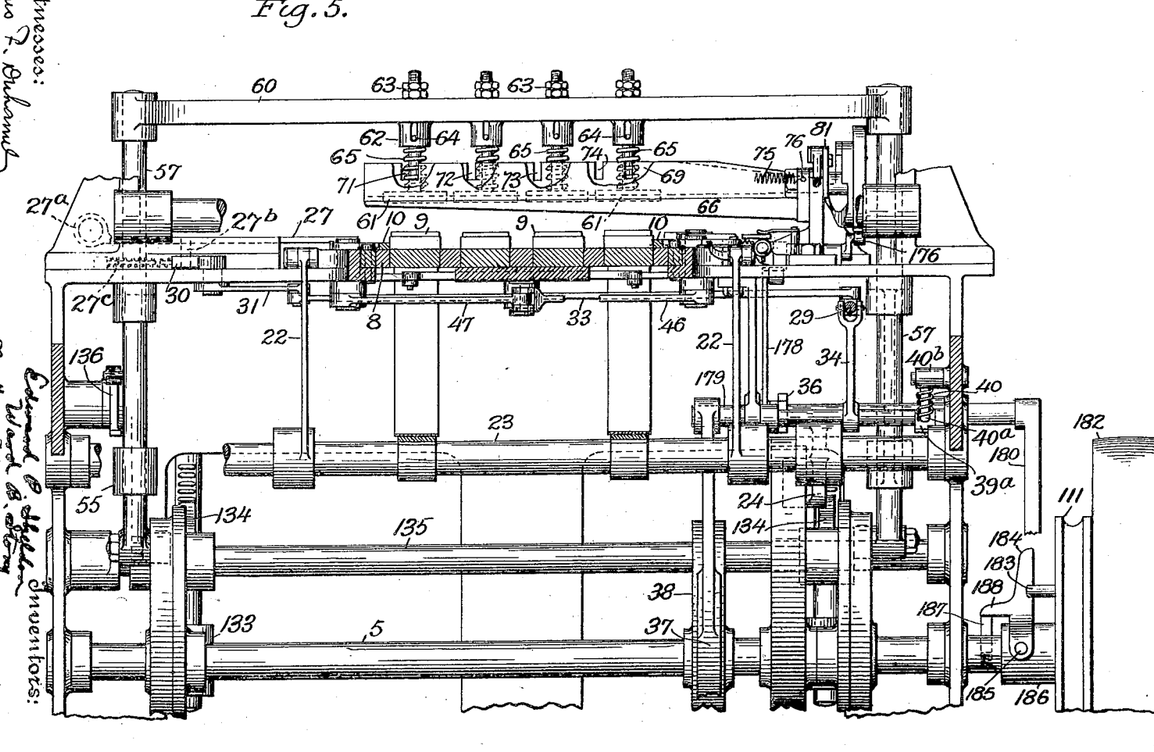
Fig. 5 is a vertical transverse section of the machine.
Figure 11:
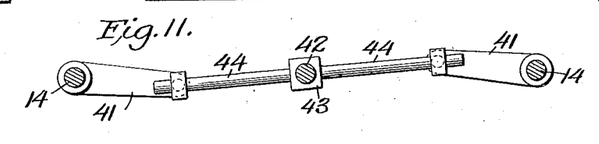
Fig. 11 is a detail view showing the connection between the operative and inoperative feed-fingers.

It is necessary when putting the galley in position for the initial movement to have a stop to temporarily check and hold it for the engagement of the proper feed-fingers 13. This is accomplished by means of a sliding stop-bar 27, carried in a slideway 28, secured to the bed of the machine at one side of the galley 8 and which is yieldingly connected with the starting-rod 29 by means of the bell-crank-arranged arms 30 and 31, the link 32, and lever 33. The slide 27 has at its rear end a finger-piece 27$^a$, which carries a perforated depending lug 27$^b$, and through this lug plays the stem 27$^c$ of a yoke 27$^d$, carrying rollers, between which acts the end of the lever 30. This enables the operator to withdraw the slide from the path of the galley without interfering with the position of the said lever, and consequently starting the machine, as will be later explained. As shown in Fig. 1, the starting-rod 29 is attached to an arm 34, secured to a shaft which also carries an arm 35. The latter and an arm 36, attached to the brake-shoe 37, forms a toggle to throw the shoe in contact with the face of the brake 38, Fig. 5. Another arm, 39, connected with the arm 34, puts a spring 40 under tension when the rod 29 is thrown in to apply the brake and shut off the power. The arm 39 carries at its outer end a swiveled block 39$^a$ and through this block plays one end of a rod 40$^a$, which is encircled by the spring 40 and has its end pivoted to the frame at 40$^b$. The spring 40 is under tension between the block 39$^a$ and the hub of the pivoted end and tends to hold the arm 39 in either of its extreme positions and cause the brake-shoe to operate on the brake. The pivot-pins 14 of the feed-fingers are journaled in the ends of the sliding blocks 15 and carry on their lower ends, as shown in Fig. 11, crank-arms 41. The blocks also carry at a central point vertical pins 42, which loosely carry blocks 43 with oppositely-extending rods 44, which pass through openings in the pivoted blocks 45 on the outer ends of the crank-arms 41. When the feed-fingers 13, which are now engaging the teeth of the sides 10 of the supplemental frame are thrown out of engagement by the means which will be hereinafter described, the crank-arm 41 on the lower end of its pivot-pin is likewise shifted, and the block 43 and its rods 44 shift the crank-arms of the inoperative fingers and throw the latter into engagement with the teeth, and these newly-engaged teeth now propel the galley in a reverse direction. The shifting of the feed-fingers is brought about in the following manner: When the lower end of the galley reaches the impression-blocks, the feed-finger on the right-hand side of the machine is struck on its return movement by the projection 45, carried by the lower side 12 of the galley-frame, and the curved inner face 13$^a$ of the finger rides up the projection and out of its path. The pivot-pin of this finger also carries an arm 46, loosely connected with a corresponding arm on the pivot of its coacting finger at the other side of the galley, and when the finger is thrown out of gear on one side of the galley the other necessarily follows. The other finger on the right-hand side of the machine is also similarly shifted by a projection 45 on the end of the front side 11 of the supplemental galley-frame, and each of these fingers is provided with a pin 13$^b$. The pivot-pin 42 on this side of the machine carries on its upper end a hub 48, which is provided with two oppositely-projecting arms 49, each of which is in the path of a pin on one or the other of the fingers 13 on that side of the machine. A rearwardly-extending arm 50 of the hub 48 has a spring 51 under tension connected with it, the other end of the spring being attached to a pin on the head of pivotal pin 20, and the strength of the spring is being exerted through one of the arms 49 on the pin 13$^b$ of the inoperative feed-finger. When, therefore, the operative finger is shifted and the device illustrated in Fig. 11 starts to throw the inoperative fingers into play, the tension of the spring 51 causes an instant movement and engagement of these fingers. In the path of the rear sides of the arms 49 are vertical pins 49$^a$, which limit the rearward movement of the said arms while the pins 13$^b$ limit the forward movement of the arms.

Pivoted on bearings 52, secured to the bed 2, are curved-faced arms 53, which engage the rearwardly-projecting ends 54 of the feeding-fingers on the back stroke of the same and throw the same into engagement with the teeth, and springs 54$^a$ allow these arms to yield and avoid the short quick impact which would damage these parts. These rear ends 54 of the feeding-fingers only engage the arms 53 when the fingers are operating in the teeth 10 and are carried back for reëngagement with the same. It will be observed in Fig. 4 that the inoperative feed-finger is out of the line of engagement with its spring-arm 53, but is thrown in line of contact with the same when the operative finger is thrown out.

Before describing other devices which are shown in connection with the feed-fingers it will be necessary to describe the printing or impression mechanism which is controlled by these parts and whose object and operation should be described first.

Figures 6, 7:
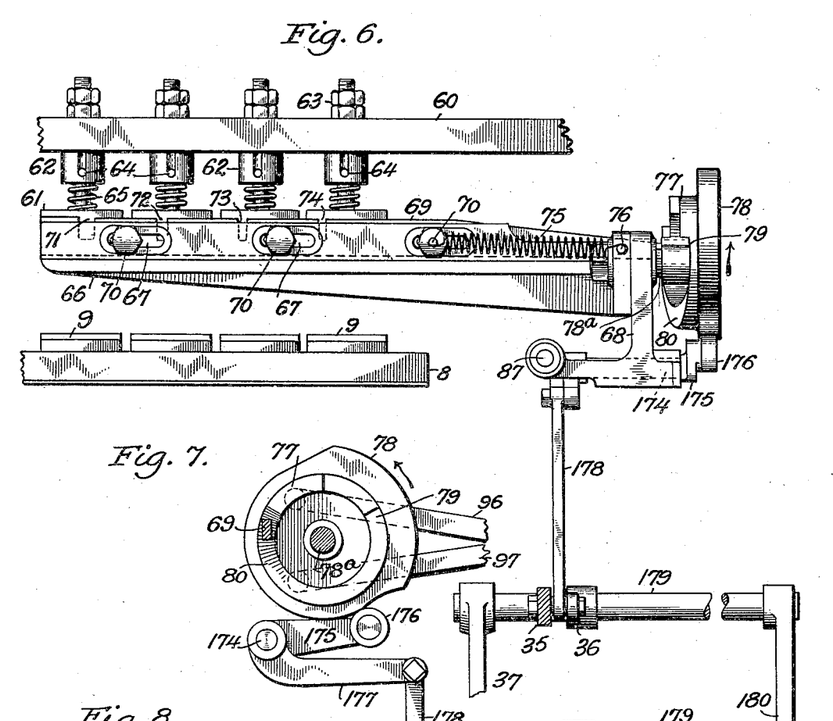
Fig. 6 is a detail face view of the printing-impression blocks and the mechanism for stopping the machine when the printing of all the addresses is completed.
Fig. 7 is a detail view of the cam controlling the impression-blocks and stopping the machine.
Figures 8, 9:
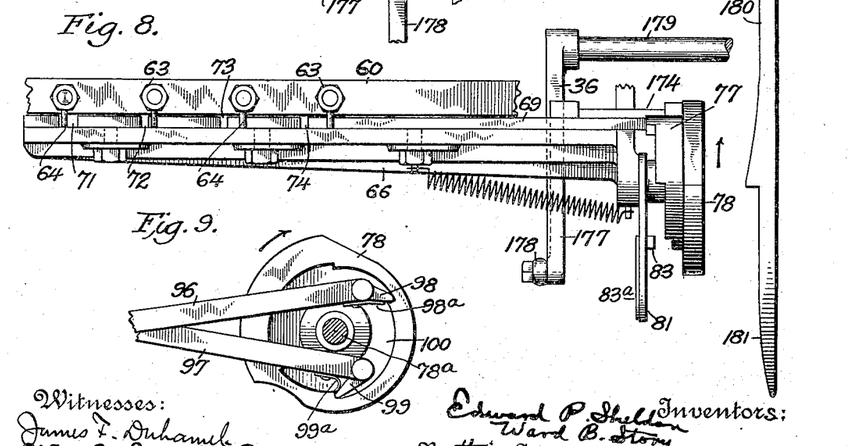
Fig. 8 is a plan view of the mechanism shown in Fig. 6.
Fig. 9 is a view of the cam on the reverse side as shown in Fig. 7.

In the bearings 55 of brackets 56, depending from the under side of the bed 2, play vertically the rods 57, having at their lower ends rollers 58, which enter the cam-groove 59 of the disk 60. These rods after passing through the necessary openings in the bed of the machine carry at their upper ends the cross-bar 60, which is provided with as many impression-blocks 61 as there are columns of addresses in the galley, and these blocks are so disposed as to be directly over one of these columns. The blocks proper, 61, may be provided with a facing of rubber or some similar substance to press the interposed paper upon the type of the galley, and upward from the blocks project stems which pass through the necessary slotted bearings 62 on the cross-bar 60 and carry at their upper ends adjusting and check-nuts 63. Lateral pins 64, carried by the stems, play in the slots, while springs 65 are placed on the stems between the blocks and the bearings to allow the movement of the stems in the bearings, but normally to hold the blocks at their lowest limit permitted by the pin in the slot. Along the front line of the impression-blocks extends a bracket 66 with horizontal slots 67 and supported by the standard 68, which is secured to the bed of the machine. On the rear side of this bracket and in front of the blocks 61 is a slotted bar 69, loosely held against that side of the bracket by screws 70, which play freely in the horizontal slots 67. In Figs. 6 and 8 it will be seen that the pin 64 of the left-hand stem would descend into a slot 71 if the cross-bar 60 should carry the blocks in the direction of the type-columns 8$^a$ of the galley 8, while the remaining pins do not register with either of the slots 72, 73, or 74 of the bar 69, but their downward movement would be arrested by the upper edge of the bar and the impression-blocks be prevented from forcing the wrapping-paper or envelop down upon the type. It is apparent that a slight movement of the bar 69 to the right would permit the pin of the second stem to register with the slot 72, while the slot 71 would not be in position to receive its pin. With continued movement to the right the slots 73 and 74 would be brought into position to receive their respective pins, while all the other pins would be held up by the upper edge of the bar 69. To one of the screws 70 of the bar 69 is secured one end of a tension-spring 75, while the other end is secured to a pin 76 on the bracket 66, so it will be seen that the tension of the spring is exerted to draw the end of the bar against one of the steps of a lateral cam-face 77 of a disk 78. The position of the bar being such as to allow the descent of the first impression-block only, the partial rotation of the disk in the direction indicated by the arrow in the above-mentioned figures would remove the end of the bar to the next lower step of the lateral face or in position to allow the second block only to operate, and with the continued rotation of the disk the bar is successively brought into position to permit the operation of the third or fourth block and on to the lowest part 79 of the face, when the complete revolution of the disk would carry the end of the bar along the inclined face 80 and on the highest step. The disk 78 is carried by a stud 78$^a$, projecting from the standard 68, and pivoted loosely on this stud is an arm 81, to the end of which is attached a rod 82 operative at the front of the machine. A lateral lug 83 at the end of a flat spring 83$^a$ on the arm 81 and passing through a hole therein engages the highest step on the lateral face 77, and consequently when it is desired to set the bar 69 for registration with the pin of the first impression-block and the utilizing of the first column of addresses in the galley the bar 82 is shoved in to its limit, which is regulated by the contact of the arm 81 with the bar 69, and the lug 83 leaves the said step in the desired position. With the forward and reverse movement of the galley and the consequent operation of one after another of the several impression-blocks it is necessary that this shifting of the cam-disk 78 should be done automatically the instant the movement of the galley is reversed, so that the succeeding block is brought into play, and this is done by the mechanism at the right of the two shifting feed-fingers, as shown in Fig. 4. These feed-fingers carry each a projecting lug 84, adapted to engage similar lugs 85 and 86, both carried by longitudinally-shifting shaft 87, which slides in suitable bearings in the base of the standard 68. When one of the feed-fingers carrying a lug is thrown to its inoperative position, the lug engages one side of the lugs 85 or 86 and carries the shaft with it on the next move of the block 15. In Fig. 4 the inoperative finger and its lug have carried the shaft 87 to the position shown, and with the next arrangement of these fingers the lug 84 of the now operative finger will be forced back of the lug 86 and the forward movement of the block and finger will carry this lug 86 with it and shift the shaft 87. In order to allow the lugs 84 to pass their respective cooperating lugs 85 and 86, the opposing faces in the backward movement are beveled and the shaft 87 is adapted to turn slightly on its axis in the bearings; but it is restrained from turning too far and is returned to its normal position by a spring 87$^a$, secured to its under side and bearing on the base of the standard. The inoperative movement of the lug of the newly-shifted finger already finds one of the lugs of the shaft seated against one of its bearings, and consequently the meeting of the beveled faces results in the turning of the shaft to such an extent that the lug of the finger can pass under that of the shaft and take up its position in its rear.

The shaft 87 carries at one end a sleeve 88, which is provided with a pin 89, which plays in a slot in one end of a lever 90, pivoted to the bed of the machine by means of a pin 91, and the outer end of this lever also has a slot in which plays a pin projecting from a sleeve on a longitudinally-shifting shaft 92, carried in bearings in the bracket 93. This shaft 92 also has secured to it a sleeve 94, which carries an upright arm 95 to the upper end of which is pivoted two rods 96 and 97, having at their free outer ends pawls 98 and 99, which are pressed outward by springs 98$^a$ and 99$^a$. These pawls operate within a recess 100 in the outer face of the cam-disk 78 and upon the teeth of the annular wall of the recess so that the reciprocating action of the shaft 96 tends to rotate the disk in the direction shown by the arrow or in the direction to permit the end of the bar 69 to descend the steps of the cam-face 77, so that with the reversal of the movement of the galley the cam-disk is partly rotated to shift the bar 69 and permit the operation of another impression-block in its regular order and cause the same to impress the addresses from one separate column upon the paper.

The standard 68 has journaled in it a short lateral shaft 174, carrying on its outer end an arm 175, which is keyed thereto, and the outer end of the arm 175 carries a roller which runs on the cam-face of the disk 78 and at a certain stage yields to the irregular face of the cam and swings the arm and shaft. To the inner end of the shaft is secured an arm 177, carrying the upper end of the link 178, which connects it with the arms 35 and 36 for throwing on the brake-shoe 37 and disconnecting the power-pulley from the shaft 5.

The arm 36 and the brake-shoe 37 are both keyed to a horizontal shaft 179, and to the outer end of this shaft is keyed an arm 180 with a curved face 181. The driving-pulley 182 and the pulley 111 are secured to each other and rotate loosely on the shaft 5, and the pulley 111 carries a lateral stud 183, which rotates in the path of a lever 184, whose lower end is pivoted at 185 to a sleeve 186, secured to the shaft 5. The lever 184 is retained in its vertical position by the pressure of a pin 187, which plays in a hole in the shaft 5 and bears against the outer end of a lateral extension 188 of the lever, the pin 187 being forced outward by a spiral spring in the bottom of the hole in the shaft 5 and in its normal position being in the path of the pin 183 of the pulley, which when it rotates catches the lever 184 and carries with it the lever and the shaft 5. At the outer end of the brake-shaft 179 the arm 180 is so disposed that when the shaft is turned by the reverse movement of the starting-rod 29 on the depression of the link 178 the curved face 181 is thrown against the outer end of the lever 184, wedging the same out of its vertical position and out of the path of the lateral pin 183, which is then free to continue with the rotation of the pulley 111, while the lever 183 and the working parts of the machine remain at rest.

At the front of the machine are inking-rollers 101 and 102, under which the galley and type pass as they are placed in position on the bed 2 and the type receive their coating of ink for the printing of the addresses, and a supply-roller 103, resting on the rollers 102, receives and spreads on these two rollers the necessary ink. This supply or fountain roller is driven by gearing or the belting and pulleys 104, 105, 106, 107, 108, 109, 110, and 111, the latter on the main driving-shaft 5, and as this train of pulleys and belting has been described and claimed in the application heretofore referred to we do not consider it necessary to enter into further details. The supply-roller 103 is carried by a swinging frame 112, pivoted in the bracket 113 and which is adapted to be raised, so that the roller 103 shall be carried from contact with the rollers 101 and 102 and cease to rotate same. The frame 112 is connected with one end of a lever 114 by a link 115, and the front end of the lever 114 carries a roller 116, which receives the weight of the galley and is depressed thereby, causing the link 115 to elevate the frame 112 and roller 103. This device has likewise been described and claimed in the application referred to.

The mechanism for the manipulation and feeding of the paper will now be described.

The roll of paper 117 is carried by an extension of the upper structure 3 of the framework, and the paper as it is unrolled passes over a feed-roller 118 and between the same and a roller 119. The shaft of roller 118 carries a friction-disk 120, which will be referred to later, and the paper after passing downward passes around a roller 120 and up and over a roller 121, whose shaft is under the tension of springs, and from which the paper passes downward and around a roller 122, from which it passes horizontally over the galley, receiving its address, and under rollers 123 and 124 over a roller 125, carried by adjustable arms 126, which are swung upward or down, according to the length of the wrapper to be cut. The paper then passes under a rod 126$^a$ and over a shaft 127 and between two rollers 128 and 129 and on to a horizontal stationary blade 130. Coöperating with the blade 130 is a movable cutting-blade 131, each end of which is carried by the rods 132, playing through openings in the bed 2, where they have suitable bearings, and their lower ends play in the bearings 133 at the rear end of the frame. The lower ends of these rods are also provided with teeth in which mesh the tooth-sectors 134, keyed to a shaft 135, and which are actuated by a lever 136 through a link 137, pivoted at one end of the lever, the other end of the lever having a slot in which plays a lateral pin carried by one of the vertical rods 57. The operation of these parts is so timed that with the descent of the rods 57 and the cross-bar 60 the knife-blade 131 also descends to cut one of the wrappers. The roller 129 is carried by the outer ends of two arms 138, keyed to the shaft 127 within the framework 139, and the outer end of this shaft carries an arm 140, whose outer end is adjusted by a screw 141, which plays in a lug 142 on the outside of the framework. The adjustment of this arm 140 increases the pressure of the roller 129 on the roller 128, and consequently the efficiency of these rollers to overcome the resistance offered the passage of the paper by the various loose and stationary rollers and shafts over which it travels.

We have referred to the roller 121 as keeping the paper on each side of it under tension of springs which carry it. This is necessary to provide for a certain amount of slack which must exist between the constantly-moving feed-rolls 118 and 119 and the point when the printing takes place and where obviously the paper must remain at rest. The paper when carried away from the type after the printing is moved intermittently by the rollers 128 and 129 in the manner we will now describe.

Figures 2, 10:
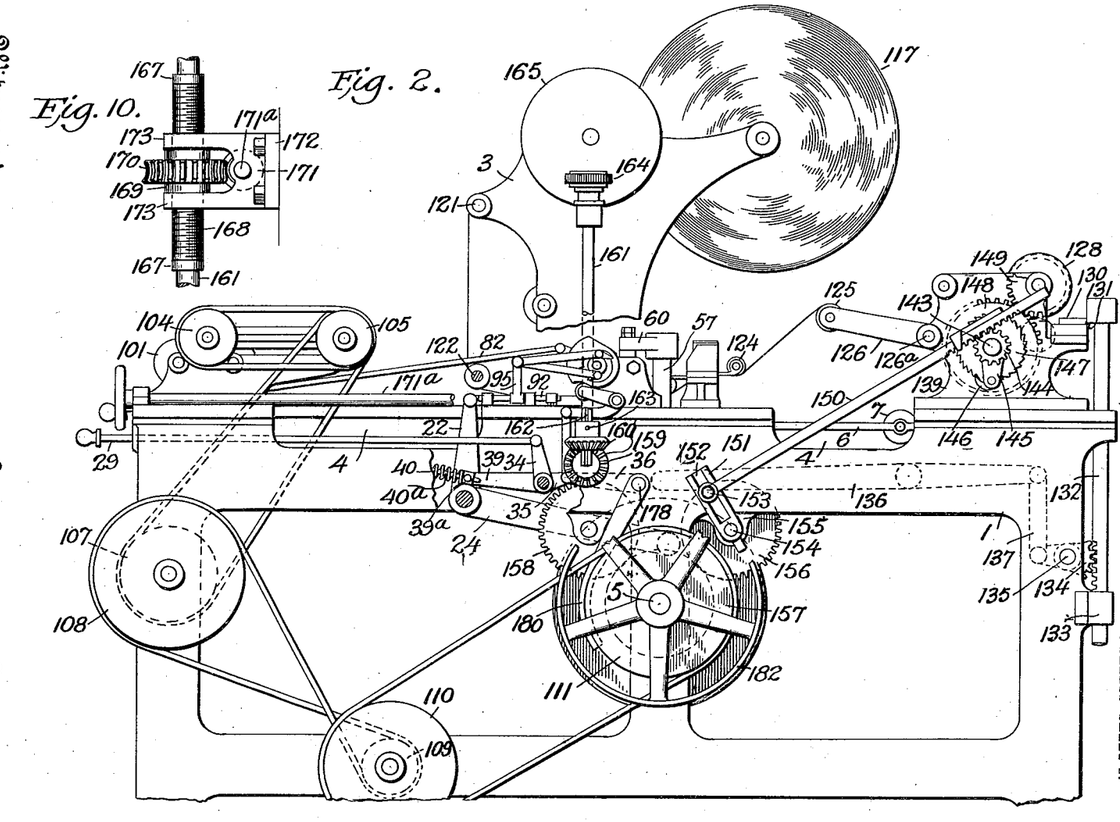
Fig. 2 is an elevation of the side opposite that shown in Fig. 1.
Fig. 10 is a detail view of the device for increasing or decreasing the speed of the paper-feed.
Figure 3:
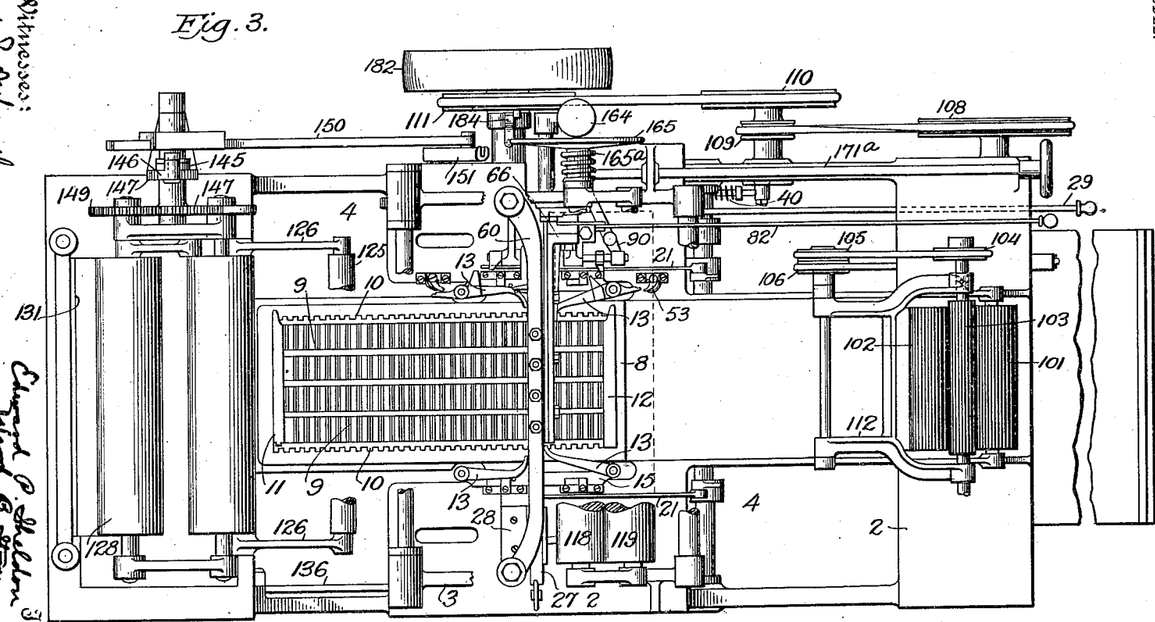
Fig. 3 is a plan view of the machine.

From one side of the frame 139 extends a stud 143, which carries loosely a pinion 144, having secured to it a crank-arm 145, which carries on its outer end a pawl 146 to engage the teeth of a ratchet-wheel 147, secured to the side of a gear-wheel 148, and this gear-wheel meshes with a pinion 149 on the shaft of roller 128. The pinion 144 is actuated by a rack-bar 150, whose one end is pivoted to a grooved or slotted crank-arm 151 and is reciprocated thereby. The slot 152 in this crank-arm is to permit of the adjustment of the pivoted end, which is done by means of a wrist-pin which may be loosened and moved to the desired point along the slot and then tightened again. The crank-arm 151 is carried by a short shaft 154, rotating in a bearing 155 and carrying on its inner end a gear-wheel 156, which is driven by a similar gear-wheel 157 on the main driving-shaft 5. The reciprocation of the rack-bar 150 causes the rotation of the wheel 144 through a certain arc, the degree being regulated by the distance from the center of the shaft 154 the pivotal connection of the rod 150 is removed, and the ratchet-wheel 147 is carried through the same arc by the arm 145 and pawl 146 and rotates the roller 128 the desired extent to feed out the wrapper to be cut. The gear-wheel 157 also gears with a similar wheel 158, which drives a pinion on the shaft of the bevel gear-wheel 159, the shaft being journaled in the frame of the machine, and the bevel-gear 159 meshes with a similar wheel 160, sliding on a vertical shaft 161, having a slot 162 to receive a pin 163 from the hub of the wheel 160, which therefore is enabled to rotate the shaft while the latter shifts vertically. The upper end of shaft 161 carries a friction-pulley 164, which drives a disk 165 on the end of the shaft 166 of the roller 118. A spring 165$^a$ encircles the hub of the disk 165 and is under tension between the disk and the bearing on the frame and which affords sufficient pressure from the disk on the pulley to insure the disk being driven by the pulley. The mechanism here described drives the pulleys 118 and 119, which feed the paper from the paper-roll 117 and supply the same for the printing of the addresses thereon by the types of the galley. It may be necessary to increase or decrease the speed of these feed-rollers to provide for a wrapper of greater or less length, and it is evident that the adjustment of the speed of these rollers will accomplish this object, and to provide for same we provide the shaft 161 with collars 167, which are secured thereto and loosely carry between them a sleeve 168, as shown in Fig. 10, which sleeve is provided with an exterior thread which carries a nut 169, having teeth 170, in which work the threads of a worm 171. This worm 171 is journaled in a bracket 172, secured to that side of the frame 3, and projecting arms 173 embrace the nut and the rotation of the same causes the threaded sleeve to move up or down, carrying the shaft 161 with it and varying the relations of the pulley 164 and the disk 165 and increasing or decreasing the speed of the pulley 118. The worm is secured to a shaft 171$^a$, carried by the bed of the machine and operated by a suitable hand-wheel.

It is obvious that in the operation of this machine certain variations in the different parts may suggest themselves and be resorted to without departing from the essential means of moving the galley along the bed in different directions, feeding, the throwing in and out of operation of the impression-blocks, and other details.

The toothed frame carried by the galley may be dispensed with and the feed-fingers engage the exposed upper ends of the lines of type, and the projections for shifting the fingers may be secured directly to the galley.

Having thus described our invention, what we claim as new, and desire to secure by Letters Patent, is—

1. In an addressing-machine, the combination with a frame having a bed, of a galley adapted to be moved along the bed and carrying several columns of addressing-type, a web of paper adapted to be fed over the galley, means for feeding the paper, impression-blocks, means for feeding the galley in one direction until the last address in the first column has been impressed upon the paper and automatically reversing the feed at the end of the first and successive columns until the end of the last column is reached, and means for controlling the impression-blocks to operate upon the successive columns.

2. In an addressing-machine, the combination with a frame having a bed, of a galley adapted to carry several columns of type and be moved along the bed, a web of paper adapted to be fed over the galley, means for propelling the galley over the bed of the machine, means for reversing the movement of the galley and means for impressing the paper upon the addresses successively.

3. In an addressing-machine, the combination with a frame having a bed, of a galley adapted to traverse the bed and carry columns of type, means for feeding the galleys in either direction longitudinally of the bed, automatic means carried by the galley for reversing the feed of the galley, an impression-block for each column of type one block being adapted to engage a column at a time and means connected with the feeding means for throwing the block in and out of operation.

4. In an addressing-machine, the combination with a frame having a bed, of a galley adapted to traverse the bed and carry several columns of type, sliding feed-fingers adapted to move the galley in one direction, a second set of sliding feed-fingers adapted to move the galley in the opposite direction, means for actuating the fingers and means carried by the galley to afford the engagement of the fingers.

5. In an addressing-machine, the combination with a frame having a bed, of a galley adapted to traverse the bed and carry several columns of type, sliding blocks moving parallel with the galley, means for sliding the blocks, interchangeable feed-fingers carried by the sliding blocks and alternately engaging the galley to feed the same in one or the other direction, and means carried by the galley for affording an engagement of the feed-fingers.

6. In an addressing-machine, the combination with a frame having a horizontal bed, of a galley adapted to traverse the bed, sliding blocks carried by the bed and moving on each side of and parallel with the galley, a toothed frame carried by the galley, pivoted feed-fingers carried by the blocks and adapted to alternately engage the teeth of the frame, means carried by the toothed frame to shift the fingers from feeding in one direction to the reverse direction and means for actuating the sliding blocks.

7. In an addressing-machine, the combination with an upright frame having a bed, of a galley adapted to move up and down the length of the bed, a rectangular frame with toothed or notched sides, blocks carried by the bed and reciprocating parallel with the line of movement of the galley, a feed-finger pivoted to each block and adapted to feed the galley in one direction, an interchangeable finger carried by each block for feeding the galley in the other direction, means connecting the two fingers of each block by which one throws the other in or out of engagement, means carried by the rectangular frame for shifting the operative finger to an inoperative position and means for actuating the sliding blocks.

8. In an addressing-machine, the combination with a frame having a bed, of a galley adapted to hold several columns of type and to traverse the bed of the machine, a frame adapted to inclose the sides of the columns of type and having toothed or notched sides and projecting ends, sliding blocks carried by the bed and moving parallel with the line of movement of the galley, means for actuating the blocks, feed-fingers carried by the blocks and adapted to feed the galley in one direction and be thrown out of engagement with the teeth of the rectangular frame by one of the projecting ends, similar fingers carried by the blocks and adapted to feed the galley in the opposite direction and be thrown out of engagement with the teeth by the other projecting end, connecting means between the oppositely-operating fingers to prevent the two from feeding the galley at the same time, means connecting the similar feeding-fingers and means operated by the projecting ends and the fingers for stopping the machine when the end of the last column is reached.

9. In an addressing-machine, the combination with a frame having a bed, of rails arranged along the bed, a galley with several columns of type adapted to travel between the rails, blocks sliding parallel with the rails, a rectangular frame carried by the galley and having toothed sides and projecting end pieces, feed-fingers carried by the blocks and adapted to engage the teeth of the frame and be thrown out of engagement by the projecting end pieces, means connecting the fingers of each block by which one throws the other out of engagement with the teeth of the frame, means connecting each pair of operative fingers, a spring-pressed lever acting on the operative fingers, printing means adapted to operate on each column separately, means for operating the printing mechanism and means actuated by the feed-fingers for rendering the different printing means operative and inoperative.

10. In an addressing-machine, the combination with a frame having a bed, of rails arranged along the same, a galley containing columns of type and adapted to move between the rails, a frame adapted to inclose the sides of the columns of type and having toothed or notched side pieces and projecting end pieces, sliding blocks carried by the upper side of the bed and moving parallel with the rails, means for moving the blocks, feed-fingers, carried by each block adapted to propel the galley and its toothed frame one way or the other between the rails and be thrown out of engagement by the projecting ends, lateral projections on two of the oppositely-acting fingers, a shifting shaft with lugs adapted to be engaged by the inoperative finger, printing means adapted to operate in conjunction with one column of type at a time and means connected with the shifting shaft for controlling the action of the printing means with relation to the several columns of type.

11. In an addressing-machine, the combination with a frame having a bed, of a galley carrying several columns of type and adapted to traverse the bed, a toothed frame carried by the galley, feed-fingers adapted to engage the teeth of the frame to carry the same in one way or the other, means for operating the feed-fingers, means for shifting the feed-fingers, a cross-bar carrying impression-blocks corresponding in number with the columns of type and adapted to be carried one at a time toward one of the columns of type, means for operating the cross-bar, lateral projections from two of the oppositely-operating fingers, a shifting shaft having projecting lugs for the engagement of the inoperative feed-finger, a slotted bar adjacent to the cross-bar and adapted to prevent the operation of all but one impression-block and intermediate means by which the shifting shaft moves the slotted bar to permit the operation of a different impression-block.

12. In an addressing-machine, the combination with a frame having a bed, of a galley adapted to traverse the bed and carrying a plurality of columns of type, a frame carried by the galley and having toothed sides and projecting ends, sliding blocks, means for actuating same, pivoted fingers carried by the blocks and adapted to reciprocate the galley along the bed by engaging the teeth of the frame on the galley, spring-impelled arms for forcing the fingers into sudden engagement with the toothed sides, lateral projections carried by the fingers, a sliding rod carrying lugs for the alternate engagement of the projections on the fingers, a cross-bar playing vertically above the bed and galley, means for actuating the cross-bar, impression-blocks carried by the cross-bar and adapted to be restrained from moving downward with the same, a slotted bar carried by a bracket parallel with the cross-bar and adapted to slide longitudinally so that its slots will permit of the operation of one impression-block at a time, means carried by each block to permit of the control of same by the slotted bar, a cam controlling the position of the bar with relation to the impression-blocks and means interposed between the cam and the sliding rod with the lugs for operating the cam.

13. In an addressing-machine, the combination with a frame having a bed and rails, of a galley adapted to traverse the rails and bed longitudinally in either direction and carrying columns of type, a toothed or notched frame carried by the galley, sliding blocks adapted to move parallel with the line of motion of the galley, means for actuating the same, feed-fingers carried by each block for feeding the galley in reverse directions, spring-pressed levers effecting the engagement of the operative fingers, pivoted arms with a spring adapted to hasten the engagement of the fingers thrown into operation, means carried by the galley, to throw the fingers in and out of operation, interchangeable means connecting the fingers of each block, a cross-bar moving vertically above the bed and galley, spring-pressed impression-blocks with stems playing in the cross-bar and having lateral pins, a laterally-sliding bar having vertical slots for the reception of the pins of the stems of the impression-blocks, a cam adapted to shift the bar to adjust the slots for the reception of a certain pin, means interposed between the cam and the feed-fingers by which the latter rotate the cam to adjust the slotted bar for the reception of the successive pins as the printing of the addresses progresses and means for returning the cam and bar to the position to receive the pin of the first block when the printing of all the addresses of the galley is completed.

14. In an addressing-machine, the combination with a frame having a bed provided with rails and guideways, of a galley adapted to traverse the rails, teeth or engaging means carried by the galley, blocks sliding in the guideways, means for actuating the blocks, feed-fingers pivoted to the blocks and engaging the teeth on the galley, crank-arms carried by the pivotal stem of each finger, a pivoted lever connecting the crank-arms of the two fingers of each block, means carried by the galley for throwing the fingers out of engagement with the teeth when the ends of the galley are reached, a sliding rod, means carried by the fingers and rod for shifting the latter when one of the fingers is thrown out of operation, a lever connected with the rod, a second shifting rod connected with the other end of the lever and carrying an upright arm, pawls carried by the upright arm, a cam with teeth and adapted to be rotated by the pawls, a slotted bar adapted to be shifted by the cam, impression-blocks, means carried by the impression-blocks which are controlled by the slotted bar to hold them in an inoperative position and means for operating the impression-blocks.

15. In an addressing-machine, the combination with a frame having a bed, of a disk with a peripheral cam-face and a lateral cam-face or steps, a slotted bar adapted to be adjusted by the lateral steps, impression-blocks with pins adapted to play separately in the slots of the bar, a vertically-moving cross-bar carrying the impression-blocks, means for moving the cross-bar, a toothed recess in the disk, pawls adapted to engage the teeth in the recess, rods carrying the pawls, a shifting shaft with an arm to carry the rods with the pawls, a second shifting shaft with a spring to limit its axial movement and having beveled lugs at each end, a pivoted lever whose ends connect the two shifting shafts, feed-fingers having lugs to engage the lugs on the second shifting shaft, feed-fingers connected with and coöperating with same, means for actuating the feed-fingers, a galley containing columns of type, having engaging means for the feed-fingers and adapted to traverse the bed beneath the cross-bar and means carried by the galleys for automatically shifting the feed-fingers when the end of a column is reached.

16. In an addressing-machine, the combination with a frame having a bed, of a galley carrying columns of type and adapted to traverse the bed, means for actuating the galley, a sliding stop-bar adapted to position the galley for the initial operation of the machine, a driving-shaft carrying a loosely-disposed driving-pulley, means for locking the pulley to the shaft, means interposed between the stop-bar and the locking means by which the stop-bar is removed from the path of the galley when the pulley is locked to the wheel.

17. In an addressing-machine, the combination with a frame having a bed, of a galley carrying columns of type and adapted to traverse the bed, means for actuating the galley, a laterally-sliding stop-bar adapted to be slid in the path of the galley to position it for the initial operation of the machine, a power-shaft, a pulley adapted to be locked to the power-shaft, means for locking the pulley to the shaft, means connecting the locking means to the sliding stop-bar and means for operating the stop independent of the connecting means.

18. In an addressing-machine, the combination with a frame having a bed, of a galley adapted to traverse the bed and carrying columns of type, impression-blocks, a cross-bar carrying the impression-blocks and adapted to move vertically, means for moving the cross-bar, a slotted bar controlling the operation of the impression-blocks, a disk with a cam on its periphery and having a lateral cam or stepped face to shift the position of the slotted bar, an arm carrying a roller at its outer end and which is actuated by the peripheral cam when the slotted bar has been shifted to one of its extremes, a shaft carrying the lever with the roller, a second arm carried by the shaft, a brake, a power-shaft, a pulley loosely carried by same, means for locking the pulley to the shaft, and means operated by the second arm for operating the brake and locking the pulley to the power-shaft.

19. In an addressing-machine, the combination with a frame having a bed, of a galley, a vertically-reciprocating cross-bar, impression-blocks carried by same, a slotted bar controlling the action of the impression-blocks, a cam with lateral steps for shifting the position of the slotted bar, an arm with a roller actuated by the cam, a shaft carrying the arm, a second arm on the shaft, a shaft with a brake-shoe and a cam-faced arm and having a crank-arm, a link connecting the latter crank-arm with the second arm of the shaft carrying the roller-arm, a brake, a power-shaft carrying same, a loose pulley on the power-shaft, means for driving same, and means normally locking the pulley to the shaft and adapted to be operated to release the same by the cam-faced arm.

20. In an addressing-machine, the combination of a frame having a bed, of printing means, a cam with lateral steps for controlling the operation of the printing means, means for setting the cam for its initial operation, a brake-shoe, a power-shaft carrying a brake-disk and a loose driving-pulley, means for normally locking the pulley to the shaft and means operated by the cam for simultaneously releasing the pulley and applying the brake-shoe.

21. In an addressing-machine, the combination of a frame having a bed, of a galley adapted to be propelled along the bed, feed-fingers adapted to be shifted to reverse the movement of the galley, means for actuating the feed-fingers, means for shifting the feed-fingers, a cam having a lateral cam-face or steps, means operated by the feed-fingers when shifted for moving the cam through one step, a power-shaft with brake-disk and loose pulley, a brake-shoe, means connecting the pulley with the shaft and means operated by the cam for applying the brake and releasing the pulley from the shaft.

22. In an addressing-machine, the combination with a frame having a bed, of a galley traversing the bed, feed-fingers moving the galley, means for actuating the feed-fingers, impression-blocks, means for carrying and operating the impression-blocks, a power-shaft carrying a brake-disk and a loose pulley, means for locking the pulley to the shaft, means for driving the pulley, a cam having a lateral cam or steps and a toothed recess, rods with pawls engaging the teeth to rotate the cam, means carried by the galley for shifting the fingers to reverse their action, means for controlling the action of the impression-blocks, means connecting the cam with the brake-shoe and the locking means, and means connected with and operated by the fingers when shifted for actuating the pawls to rotate the cam so as to shift the controlling means from one impression-block to another and eventually applying the brake and releasing the pulley.

23. In an addressing-machine, the combination with a frame having a bed, of a galley adapted to traverse the bed, feeding means for propelling same, means for actuating the feeding means, a power-shaft with a brake and having a loosely-mounted pulley adapted to be locked and unlocked thereto, a cam rotated by the feeding means and adapted at a certain stage of its rotation to set the brake and unlock the pulley from the shaft, means for returning the cam to its initial position without releasing the brake and locking the pulley and means for driving the pulley.

24. In an addressing-machine, the combination with a shaft and pulleys loosely mounted on same, one having a lateral pin, and means for driving the pulleys, of a lever pivoted to the shaft radially and normally held in the path of the lateral pin, a cam-faced arm adapted to remove the lever from the path of the lateral pin, a returning-spring, a galley adapted to traverse the machine, feed-fingers adapted to propel the galley in one direction or the other, crank-arms connected with the feed-fingers by links, means connected with the power-shaft for actuating the crank-arms, and means interposed between the feed-fingers and cam-faced arm for actuating the latter when the galley has reached a certain point.

25. In an addressing-machine, the combination with a roll of paper, of means for continuously feeding same, printing means, taking-up means interposed between the feeding means and the printing means, a knife operated by the printing means, a roller for feeding the web of paper to the knife, a ratchet-wheel keyed on the shaft of the roller, a crank-arm swinging loosely on the same shaft and having a pawl to engage the ratchet-wheel and means for oscillating the crank-arm on the shaft.

26. In an addressing-machine, the combination of the following elements: printing means, continuous-feeding means, slack-taking-up means, a knife working simultaneously with the printing operation, a roller feeding the web from the slack-take-up to the knife, a ratchet-wheel attached to the roller, a crank-arm loose on the shaft of the roller with a pawl operating on the ratchet-wheel, a cog-wheel connected with the crank-arm, a rack-bar having teeth meshing with the cog-wheel and adapted to reciprocate and move the wheel through a certain arc, a crank-arm adjustably carrying one end of the rack-bar, a gear-wheel on the shaft of the latter crank-arm, a power-shaft carrying a gear-wheel to mesh with the gear-wheel of the crank-arm and means for driving the power-shaft.

27. In an addressing-machine, the combination with a frame having a bed, of a galley adapted to contain several columns of type and to move up and down the bed, means for propelling the galley, means for reversing the propelling means, a power-shaft, means for driving same, a gear-wheel on the power-shaft, a roll of paper, means connected with the gear-wheel for effecting a continuous feed of the paper, printing means, a knife, means for actuating the knife and intermittent means for feeding the printed web to the knife connected with and driven by the gear-wheel on the power-shaft.

28. In an addressing-machine, the combination with a frame having a bed, of a galley adapted to traverse the bed, feed-fingers actuating the galley, means for reversing the action of the feed-fingers, a paper-roll, feed-rollers, a friction-disk on the shaft of one of the feed-rollers, a friction-pulley, a vertical shaft with a groove carrying the same, a miter-gear on the lower end of the shaft and having a spline traveling in the groove, a second miter-gear meshing with the first and carrying a pinion on its shaft, a power-shaft with a gear-wheel, an intermediate gear-wheel between the pinion and the gear-wheel on the power-shaft, a threaded sleeve loosely carried between sleeves on the vertical grooved shaft, a nut adapted to play on the threaded sleeve and having teeth, a worm operating the teeth of the nut, a forked bracket straddling the nut and carrying the worm, means for operating the worm, printing means, a knife and means connected with and driven by the gear-wheel on the power-shaft for intermittently feeding the printed paper to the knife.

29. In an addressing-machine, the combination with a frame having a bed, of a galley adapted to traverse same, means for feeding the galley, a roll of paper, continuous-feeding means for the paper, printing means, intermittent-feed means, a knife, vertically-playing rods carrying the knife and having teeth, toothed sectors meshing with the teeth of the rods, a lever connected with and operated by the printing means and a link connecting the lever with the sectors.

30. In an addressing-machine, the combination with a frame having a bed, of a galley adapted to contain several columns of type and traverse the bed in two directions, means for feeding the galley, means for reversing the feed of the galley, inking-rollers, a supply or fountain roller resting on and driving the inking-rollers, a frame carrying the supply-roller and means actuated by the galley for elevating the frame and supply-roller from the inking-rollers when the galley is placed upon or removed from the bed of the machine.

31. In an addressing-machine, the combination with a frame with a bed, of an arm adapted to be operated automatically or manually, means for operating the arm automatically, means for effecting the operation of the arm manually, a swiveled block carried at the outer end of the arm, a rod pivoted to the frame and playing through an opening in the swiveled block, a spring encircling the rod and under tension between the block and the pivoted end of the rod, a lateral shaft carrying the arm, a second arm carried by the lateral arm, a brake-shaft, an arm on the brake-shaft and connected with the second arm, a brake-shoe on the brake-shaft, a power-shaft and a brake-wheel thereon adapted to be operated by the shoe.

In witness whereof we have hereunto signed our names, this 21st day of October, 1903, in the presence of two subscribing witnesses.

EDWARD P. SHELDON.
   WARD B. STORY.

Witnesses:
 WILLIAM N. MACLEAN,
 EDWARD G. DELANEY.